US008833502B2

(12) United States Patent
Sellars

(10) Patent No.: US 8,833,502 B2
(45) Date of Patent: Sep. 16, 2014

(54) MUFFLER ASSEMBLY

(71) Applicant: Honda Motor Co., Ltd., Tokyo (JP)

(72) Inventor: Daniel Thomas Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/743,842

(22) Filed: Jan. 17, 2013

(65) Prior Publication Data
US 2014/0196973 A1    Jul. 17, 2014

(51) Int. Cl.
*B60K 13/04* (2006.01)
*B60K 8/00* (2006.01)
*F01N 13/00* (2010.01)

(52) U.S. Cl.
CPC .............. *F01N 13/00* (2013.01); *B60K 13/04* (2013.01)
USPC ........................... 180/309; 180/296; 180/89.2

(58) Field of Classification Search
USPC .................... 180/309, 228, 299, 296, 89.2
See application file for complete search history.

(56) References Cited

U.S. PATENT DOCUMENTS

| 2,081,546 | A | | 5/1937 | MacPherson | |
|---|---|---|---|---|---|
| 3,161,252 | A | | 12/1964 | Brown | |
| 3,746,127 | A | * | 7/1973 | Leventhal | 181/243 |
| 4,116,411 | A | * | 9/1978 | Masuda | 248/60 |
| 4,309,019 | A | * | 1/1982 | Bloom | 248/610 |
| 5,507,463 | A | * | 4/1996 | Kobylinski et al. | 248/610 |
| 5,673,877 | A | * | 10/1997 | Karner et al. | 248/58 |
| 5,823,286 | A | | 10/1998 | Ishihara et al. | |
| 6,402,119 | B1 | * | 6/2002 | Miska | 248/613 |
| 6,481,673 | B1 | | 11/2002 | Roe et al. | |
| 6,572,070 | B2 | * | 6/2003 | Arciero et al. | 248/610 |
| 6,758,300 | B2 | * | 7/2004 | Kromis et al. | 180/309 |
| 6,851,506 | B2 | * | 2/2005 | Bovio | 180/296 |
| 6,981,567 | B2 | * | 1/2006 | Stodolka | 180/309 |
| 7,165,645 | B2 | * | 1/2007 | Chae | 180/309 |
| 7,708,103 | B2 | * | 5/2010 | Okuyama et al. | 180/299 |
| 7,931,119 | B2 | * | 4/2011 | Fujita | 181/228 |
| 8,376,331 | B2 | * | 2/2013 | Rodecker | 180/309 |

* cited by examiner

*Primary Examiner* — Hau Phan
(74) *Attorney, Agent, or Firm* — Ulmer & Berne LLP

(57) ABSTRACT

A muffler assembly for a vehicle includes a muffler and one of a mount structure and a mount bracket, which is attached to the muffler. Vehicles that include muffler assemblies are also described herein.

15 Claims, 8 Drawing Sheets

MUFFLER ASSEMBLY

TECHNICAL FIELD

The present application relates generally to muffler assemblies for vehicles, and more particularly, to apparatus for mounting muffler assemblies to frames of vehicles.

BACKGROUND

A variety of apparatuses for attaching a muffler to a frame of an all terrain vehicle are known.

SUMMARY

In one embodiment, a muffler assembly includes a muffler and a mount structure. The mount structure includes a base portion attached to the muffler, and an upright portion integral with the base portion and extending away from the base portion. The mount structure also includes a distal end portion and a connecting portion integral with each of the upright portion and the distal end portion and extending therebetween. The distal end portion is longitudinally spaced from the upright portion and extends from the connecting portion toward, but is spaced from, the muffler. The connecting portion comprises an arcuate inner surface and an arcuate outer surface. At least a portion of the arcuate inner surface faces toward the muffler. The distal end portion defines an aperture configured to receive a male fastener.

According to another embodiment, a vehicle includes a frame that includes a frame member and a mount bracket attached to the frame member. The mount bracket is devoid of elastomeric material. The vehicle also includes an exhaust system that includes a muffler, an exhaust pipe attached to the muffler, and a mount structure attached to one of the muffler and the exhaust pipe. The mount structure is attached to the mount bracket and is configured to accommodate thermal expansion of the exhaust system relative to the frame.

According to another embodiment, a vehicle includes a frame that includes a frame member and a mount bracket attached to the frame member. The mount bracket is devoid of elastomeric material. The vehicle also includes at least one front wheel rotatably coupled with the frame, at least one rear wheel rotatably coupled with the frame, and a muffler assembly. The muffler assembly includes a muffler and a mount structure. The mount structure includes a base portion attached to the muffler, an upright portion integral with the base portion and extending upwardly away from the base portion, a distal end portion, and a connecting portion integral with each of the upright portion and the distal end portion and extending therebetween. The distal end portion is longitudinally spaced from the upright portion and extends downwardly from the connecting portion toward the muffler. The distal end portion is spaced from the muffler. The distal end portion of the mount structure is attached to the mount bracket of the frame. The upright portion of the mount structure includes a rear surface that is planar and the distal end portion of the mount structure includes a front surface that is planar and is longitudinally spaced from the rear surface of the upright portion by a first distance. The connecting portion of the mount structure includes an arcuate inner surface that extends between the rear surface of the upright portion and the front surface of the distal end portion. The arcuate inner surface blends smoothly with each of the rear surface of the upright portion and the front surface of the distal end portion.

According to another embodiment, a vehicle includes a frame that includes a frame member. The vehicle also includes at least one front wheel rotatably coupled with the frame, and at least one rear wheel rotatably coupled with the frame. The vehicle also includes an exhaust system that includes a muffler assembly, which includes a muffler. The vehicle also includes a mount bracket, which is devoid of elastomeric material. The mount bracket is attached to one of the frame member and the muffler. The vehicle also includes a mount structure that is attached to the mount bracket and is also attached to the other one of the frame member and the muffler. The mount structure is configured to accommodate thermal expansion of the exhaust system relative to the frame.

BRIEF DESCRIPTION OF THE DRAWINGS

Various embodiments will become better understood with regard to the following description, appended claims and accompanying drawings wherein:

DETAILED DESCRIPTION

Figure 1:
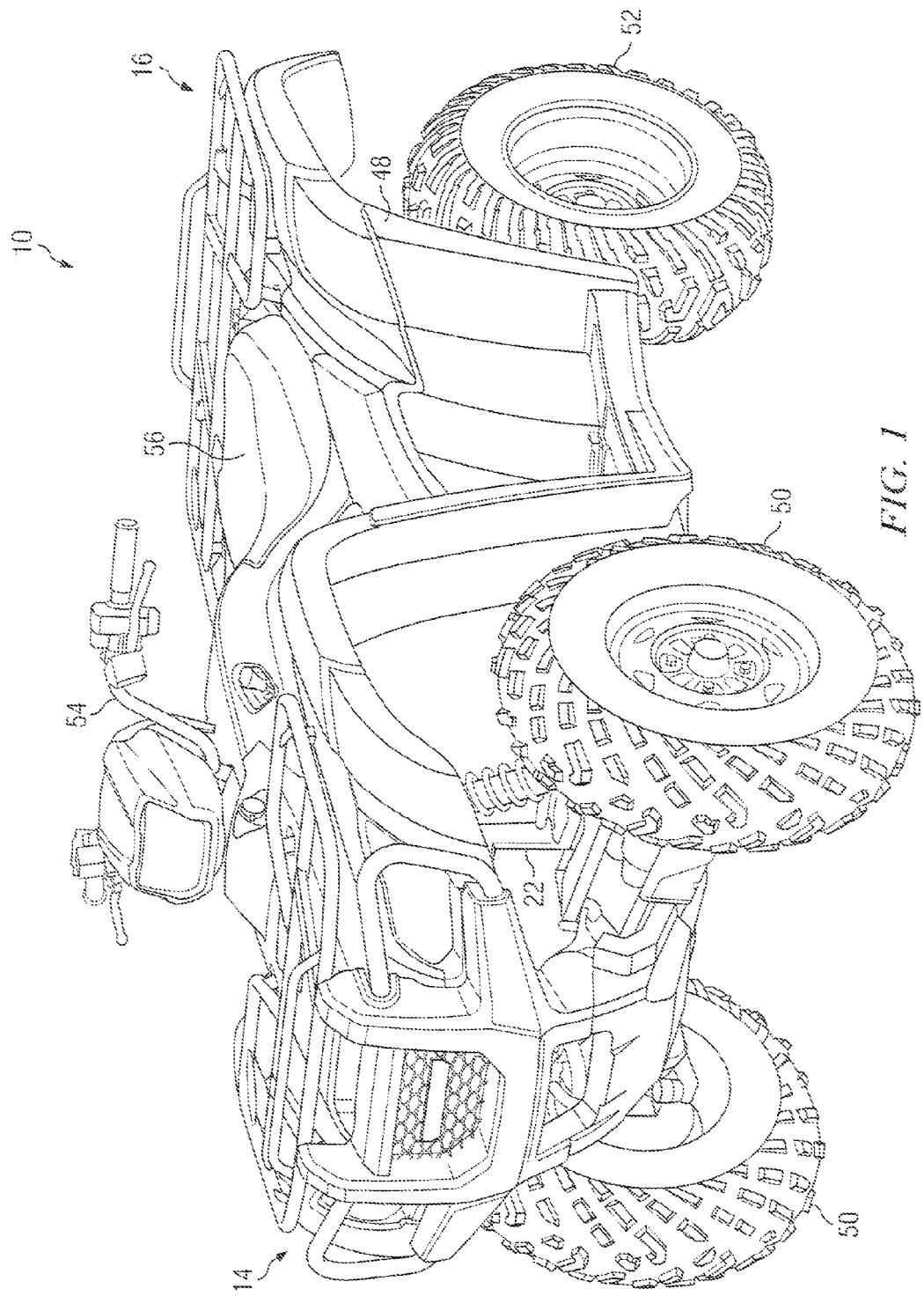
FIG. 1 is a left front perspective view of a vehicle.
Figure 2:
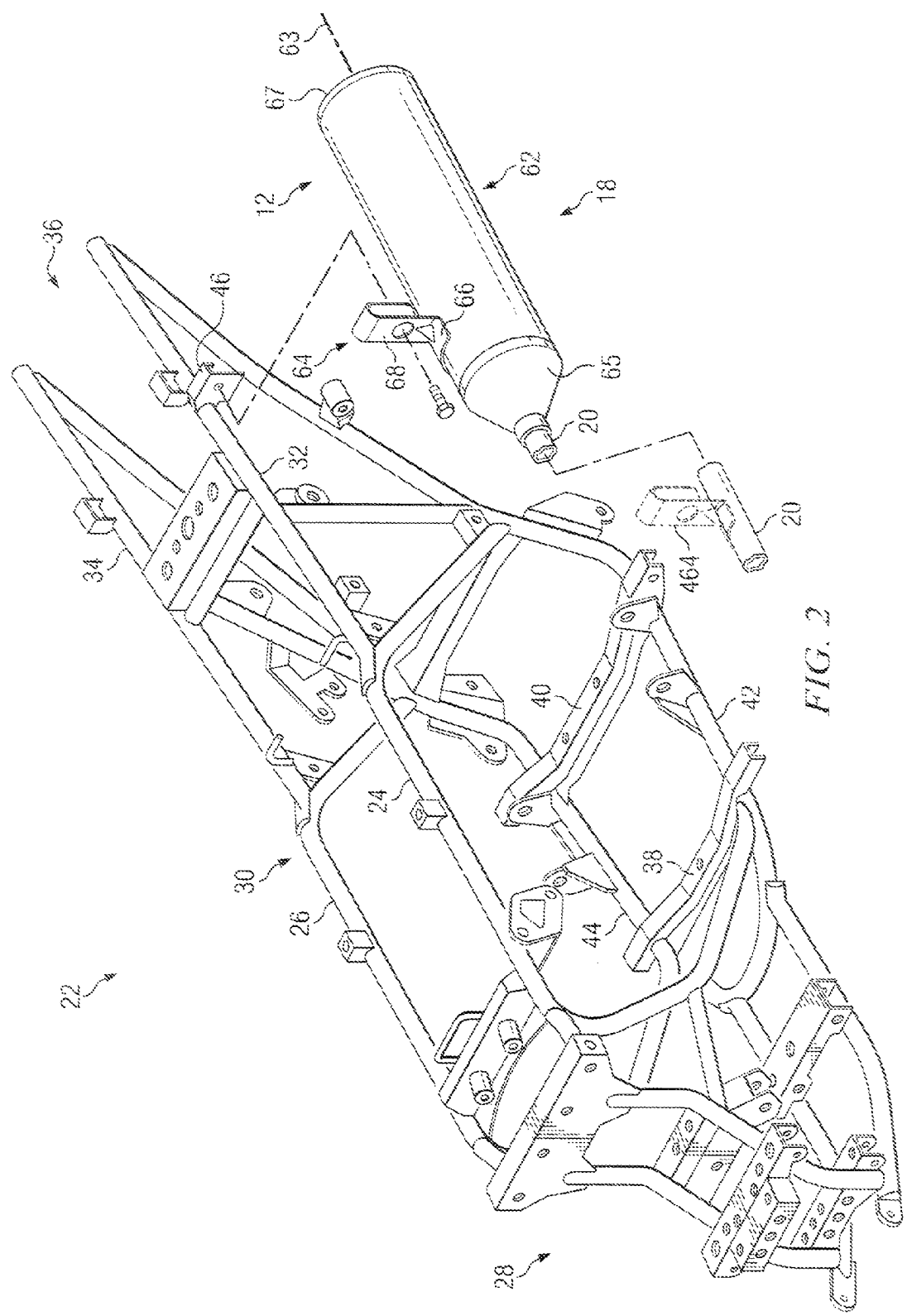
FIG. 2 is a partially exploded perspective view of a muffler assembly according to one embodiment, and a frame according to one embodiment, of the vehicle of FIG. 1.

Certain embodiments are described herein in connection with the views and examples of FIGS. 1-5, wherein like numbers indicate the same or corresponding elements throughout the views. FIG. 1 illustrates a vehicle 10 that can include a muffler assembly 12 (FIG. 2) in accordance with one embodiment. As illustrated in FIG. 1, the vehicle 10 can be an all terrain vehicle (ATV), but in other embodiments, the vehicle 10 can be another variety of saddle-type vehicle, an automobile, a truck, or any of a variety of other types of vehicles, for example. The vehicle 10 can include a front end 14 and a rear end 16. The muffler assembly 12 can be a component of an exhaust system 18 (FIG. 2), which can also include an exhaust pipe 20, or tailpipe. A rear end portion of the exhaust pipe 20 is shown in FIG. 2, attached to the muffler assembly 12. A front end portion (not shown) of the exhaust pipe 20 can be attached to an exhaust manifold (not shown) which can communicate with an engine (not shown) of the vehicle 10.

The vehicle 10 can also include a frame 22. As shown in FIG. 2, at least a portion of frame 22 can have a tubular construction. Frame 22 can include frame members 24 and 26, which can extend longitudinally, or generally longitudinally, from a front end 28 of frame 22 to an intermediate portion 30 of frame 22. Frame 22 can also include frame members 32 and 34, which can extend longitudinally, or generally longitudinally, from the intermediate portion 30 of frame 22 to a rear end 36 of frame 22. Each of the frame members 24, 26, 32 and 34 can be tubular frame members. Frame 22 can also include various members having other configurations. For example, frame 22 can include frame members 38 and 40, which can be channel members and can extend in a transverse direction. Each of the frame members 38 and 40 can be attached to each one of a frame member 42 and a frame member 44. Each of the frame members 42 and 44 can be tubular frame members. Frame 22 can also include a mount bracket 46, which can be attached to the frame member 32 in one embodiment. In other embodiments, the mount bracket 46 can be attached to any other suitable member of frame 22. The mount bracket 46 can be formed from a metal, a metal alloy, a composite material or any other suitable material. In one embodiment, the mount bracket 46 is devoid of, i.e., does not include, elastomeric material.

In other embodiments, the frame 22 can be provided in any of a variety of other suitable arrangements, such as in a unibody construction, for example, and can be formed using any of a variety of materials, such as metal or carbon fiber, for example. The frame 22 can support a body 48 of vehicle 10 (FIG. 1). Body 48 can include a variety of panels, with one or more of the panels being a decorative panel in some embodiments. The muffler assembly 12 can be attached to the frame 22 as subsequently described.

The vehicle 10 can include a pair of front wheels 50 and a pair of rear wheels 52 (one shown). The front wheels 50 and the rear wheels 52 can be rotatably coupled with the frame 22. The front wheels 50 can be steerable wheels. A handlebar assembly 54 can be coupled with the front wheels 50 to facilitate steering of the front wheels 50. Vehicle 10 can also include a seat 56 that can be supported by at least one of the frame 22 and the body 48 of the vehicle 10, and which can be configured to support an operator of the vehicle 10.

Vehicle 10 can include an engine (not shown), which can be an internal combustion engine. Vehicle 10 can also include a transmission (not shown) that can be coupled with the engine, and a rear drivetrain that can be coupled with the transmission and each of the rear wheels 52, such that the rear drivetrain is operable for transmitting torque from the transmission to the rear wheels 52, causing the rear wheels 52 to rotate. In some embodiments, the vehicle 10 can be configured as an all wheel drive (AWD) vehicle.

Referring to FIGS. 2-5, the muffler assembly 12 can include a muffler 62 and a mount structure 64 that can be attached to muffler 62. The muffler 62 can include a front end 65 and a rear end 67. In one embodiment, the mount structure 64 can be closer to the front end 65 of the muffler 62 than the rear end 67 of the muffler 62, as shown in FIG. 2. In other embodiments, the mount structure 64 can be closer to the rear end 67 of the muffler 62 than the front end 65 of the muffler, or the mount structure 64 can be positioned approximately at a center of the muffler 62, longitudinally, between the front end 65 and the rear end 67. In other embodiments, the muffler assembly 12 can include a first mount structure 64 attached to the muffler 62 adjacent to the front end 65 of muffler 62, and a second mount structure 64 attached to the muffler 62 adjacent to the rear end 67 of muffler 62. In one embodiment, the muffler 62 can be positioned at, or proximate to, the rear end 36 of the frame 22. The mount structure 64 can include a base portion 66, which can be attached to the muffler 62. For example, the base portion 66 of mount structure 64 can be welded to the muffler 62. The mount structure 64 can also include an upright portion 68, a distal end portion 70, and a connecting portion 72.

The upright portion 68 can be integral with the base portion 66 and can extend away from the base portion 66. The upright portion 68 can be transverse to the base portion 66. In one embodiment, the upright portion 68 can extend upwardly away from base portion 66, as shown in FIG. 2. The upright portion 68 can define an aperture 74 and can have a length $l_1$ (FIG. 5). The distal end portion 70 can be longitudinally spaced, i.e., spaced in a direction parallel to a longitudinal centerline axis 63 of muffler 62, by a distance $d_1$ (FIG. 5) from the upright portion 68 and can define an aperture 76. As shown in FIG. 2, the distal end portion 70 can be rearward of the upright portion 68. However, in other embodiments, the mount structure 64 can be oriented such that the distal end portion 70 is forward of the upright portion 68, or alternatively, laterally inward of the upright portion 68, i.e., closer to frame 22 than the upright portion 68. In such embodiments, the orientation and/or configuration of the mount bracket 46 can be other than that shown in FIGS. 2 and 5, to interface with the distal end portion 70 of the mount structure 64 as required. The distal end portion 70 can have a length $l_2$ (FIG. 5), which can be less than the length $l_1$ of the upright portion 68. The distal end portion 70 can extend from the connecting portion 72 downwardly toward the muffler 62, but can be spaced from the muffler 62, as shown in FIGS. 2-5. The connecting portion 72 can be integral with each of the upright portion 68 and the distal end portion 70, and can extend between the upright portion 68 and the distal end portion 70. In one embodiment, the base portion 66, the upright portion 68, the distal end portion 70 and the connecting portion 72 can be integrally formed as a unitary structure, for example, from a metal, a metal alloy, a composite material or any other suitable material.

The mount structure 64 can also include a gusset 78, which can be integral with each of the base portion 66 and the upright portion 68 of mount structure 64. In one embodiment, the gusset 78 can be integrally formed with the other portions of mount structure 64 as a unitary structure. In other embodiments, the gusset 78 can be separately formed from the other portions of mount structure 64 and can be attached to the base portion 66 and the upright portion 68, for example by welding.

In one embodiment, the upright portion 68 and the distal end portion 70 can be at least substantially parallel with one another, i.e. parallel with one another or parallel with one another within typical manufacturing tolerances associated with forming sheet metal parts. The upright portion 68 of mount structure 64 can include a front surface 80 and a rear surface 81 as shown in FIG. 5. Each of the front surface 80 and the rear surface 81 can be planar. The distal end portion 70 can include a front surface 82 and a rear surface 83. Each of the front surface 82 and the rear surface 83 can be planar. The front surface 82 of the distal end portion 70 can face the rear surface 81 of the upright portion 68 and can be spaced from the rear surface 81 by the distance $d_1$.

The connecting portion 72 can extend in a continuous arc between the upright portion 68 and the distal end portion 70. The connecting portion 72 can include an arcuate inner surface 84, having a radius of curvature R, and an arcuate outer surface 85. The magnitude of the radius of curvature R of the arcuate inner surface 84 can be one half of the magnitude of distance $d_1$, and the mount structure 64 can have a uniform thickness t throughout at least the upright portion 68, the distal end portion 70, and the connecting portion 72, such that the arcuate inner surface 84 of the connecting portion 72 can blend smoothly with the rear surface 81 of the upright portion 68 and the front surface 82 of the distal end portion 70. Similarly, the arcuate outer surface 85 of the connecting portion 72 can blend smoothly with the front surface 80 of the upright portion 68 and the rear surface 83 of the distal end portion 70. At least a portion of the arcuate inner surface 84 of the connecting portion 72 is shown to face downward, such that it faces the muffler 62.

Referring to FIGS. 2 and 5, the mount structure 64 can be attached to the mount bracket 46 of frame 22. In one embodiment, the distal end portion 70 of the mount structure 62 can be attached to the mount bracket 46 of frame 22 such that the rear surface 83 of the distal end portion 70 can be in contacting engagement with a front surface 86 of a flange portion 87 of mount bracket 46 as shown in FIG. 5. The muffler assembly 12 can include a male fastener 88, such as a bolt as shown in FIGS. 2 and 5. The frame 22 can include a female fastener 89, which can be a weld nut, which can be attached to a rear surface 90 of the flange portion 87 of mount bracket 46. The flange portion 87 can define an aperture 91. The aperture 91 can be coaxially disposed with the aperture 76 defined by the distal end portion 70 of mount structure 64 and with the aperture 74 defined by the upright portion 68 of the mount structure 64, about a longitudinal centerline axis 92 of the male fastener 88. The axis 92 can extend through a respective center of each of the apertures 74, 76 and 91. The male fastener 88 can be threaded into, or threadedly engaged with, the female fastener 89 to attach the distal end portion 70 of mount structure 64 to the flange portion 87 of mount bracket 46, which attaches the mount structure 64 to the mount bracket 46. A threaded shank of the male fastener 88 can extend through apertures 76 and 91, which can each be clearance holes in one embodiment, and into the female fastener 89.

The aperture 74 defined by the upright portion 68 of mount structure 64 can be larger than the aperture 76 defined by the distal end portion 70 of the mount structure 64. The aperture 74 can be sized such that it is sufficiently large to permit a tool, such as a socket-head torque wrench, to pass therethrough and engage a head 98 of the male fastener 88 to torque the male fastener 88. Torquing the male fastener 88 can force a surface 99 of the head 98 of the male fastener 88 against the front surface 82 of the distal end portion 70 of the mount structure 64, and can clamp the distal end portion 70 of the mount structure 64 and the flange portion 87 of the mount bracket 46 between the male fastener 88 and the female fastener 89. The connecting portion 72 can be spaced from the axis 92 by a distance $d_2$. The distal end portion 70 can extend downwardly from the connecting portion 72 to a position below the axis 92, and can be positioned above the muffler 62, as shown in FIGS. 2-5.

Figure 3:
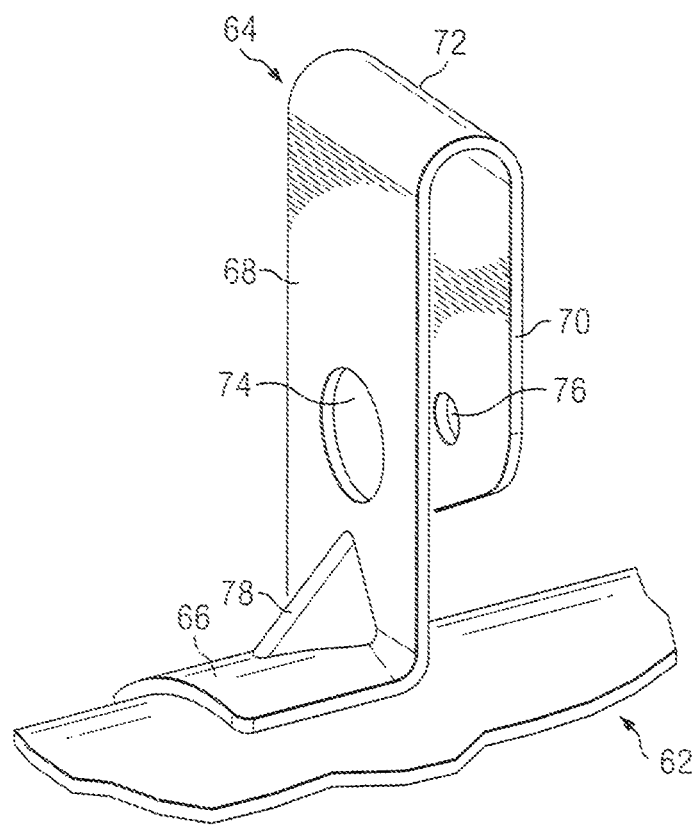
FIG. 3 is a left front perspective view depicting a portion of the muffler assembly depicted in FIG. 2.
Figure 4:
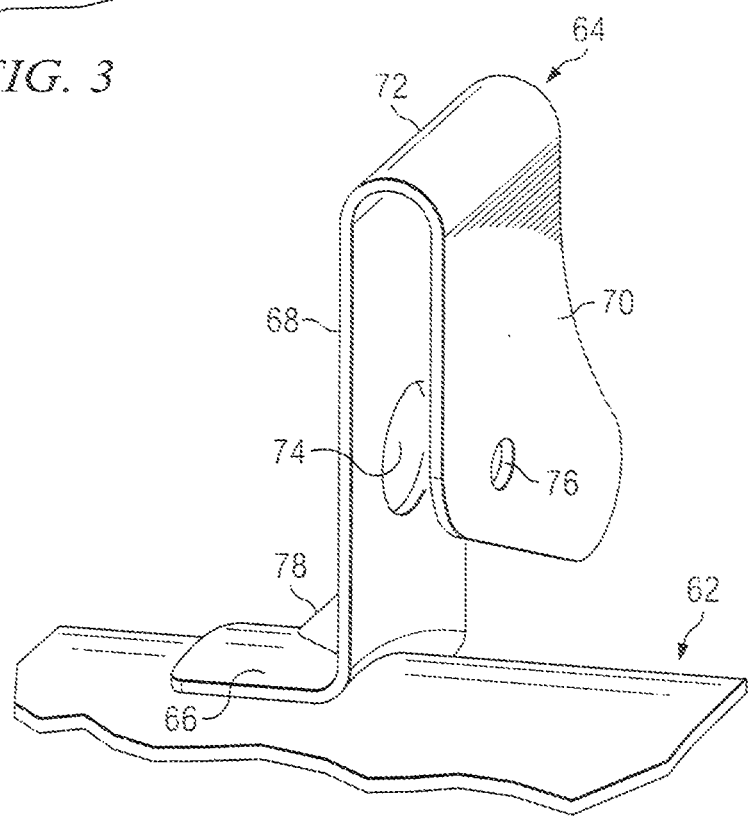
FIG. 4 is a left rear perspective view depicting the portion of the muffler assembly depicted in FIG. 3.
Figure 5:
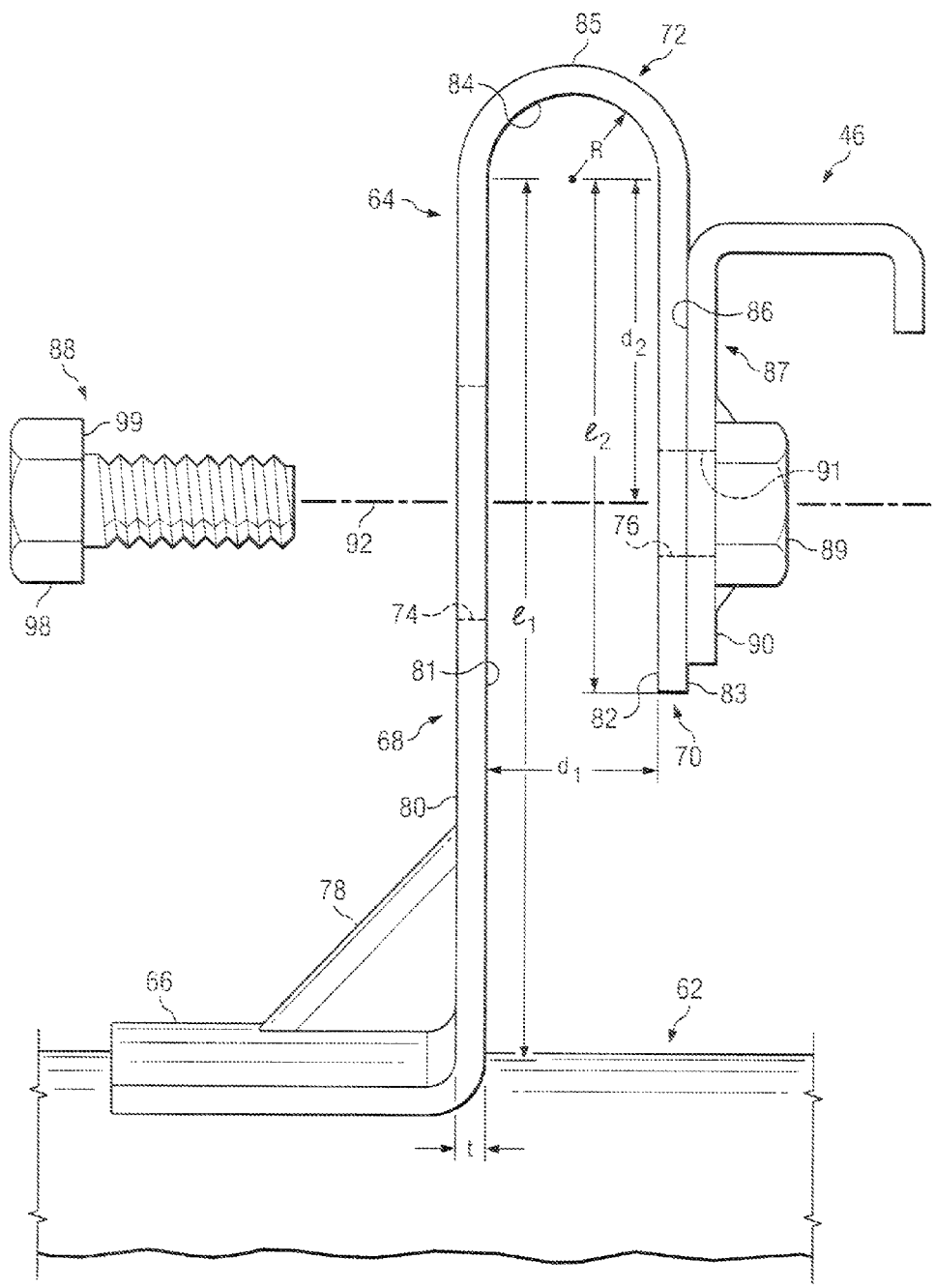
FIG. 5 is a left side elevational view, partially exploded, depicting a mount structure, a male fastener, and a portion of the muffler of the muffler assembly depicted in FIG. 2, and depicting a mount bracket and a female fastener of the frame depicted in FIG. 2.
Figure 6:
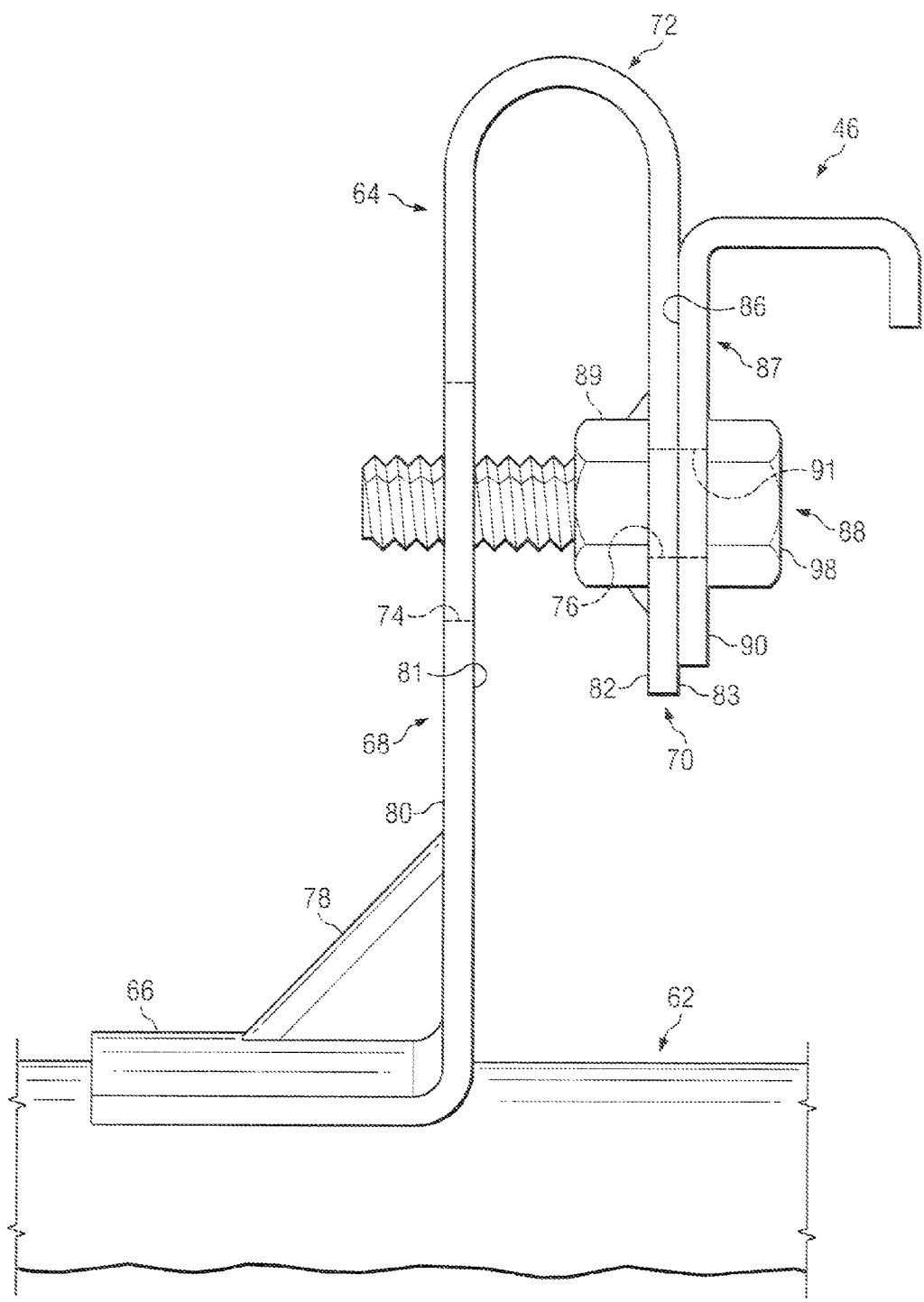
FIG. 6 is a left side elevational view, similar to FIG. 5, but depicting the male fastener associated with the frame and depicting the female fastener associated with the mount structure of the muffler assembly.

In another embodiment, shown in FIG. 6, the mount structure 64 of the muffler assembly 12 and the mount bracket 46 of the frame 22 can be attached to one another, similar to the embodiment of FIGS. 1-5. However, in the embodiment of FIG. 6, the frame 22 can include the male fastener 88 and the muffler assembly 12 can include the female fastener 89, which can be a weld nut. As shown in FIG. 6, the female fastener 89 can be attached, e.g., welded, to the front surface 82 of the distal end portion 70 of the mount structure 64. The head 98 of the male fastener 88 can contact the rear surface 90 of the flange portion 87 of the mount bracket 46 of frame 22. The male fastener 88 can be threaded into, or threadedly engaged with, the female fastener 89, to attach the distal end portion 70 of mount structure 64 to the flange portion 87 of mount bracket 46, which attaches the mount structure 64 to the mount bracket 46. The threaded shank of the male fastener 88 can extend forwardly, or generally forwardly, through the apertures 91 and 76 defined by the flange portion 87 of the mount bracket 46 and the distal end portion 70 of the mount structure 64, respectively, through the female fastener 89, and through the aperture 74 defined by the upright portion 68 of the mount structure 64, as shown in FIG. 6. A diameter of the aperture 74 can be significantly larger than a diameter of the threaded shank of the male fastener 88, which can permit movement of the threaded shank of the male fastener 88 within the aperture 74 in directions transverse to the longitudinal centerline axis 92 of the male fastener 88, while limiting the motion, or movement, of the muffler assembly 12 relative to the frame 22 in directions that are transverse to the longitudinal centerline axis 92 of the male fastener 88. This can enhance the service life of the mount structure 64 and can also protect the exhaust system 18 from damage at other locations, for example, where the exhaust pipe 20 can be mounted to the engine (not shown) of vehicle 10 via the exhaust manifold (not shown), which in turn, can protect nearby components of vehicle 10 from an excessive temperature environment. Aperture 74 is shown in FIGS. 3 and 4 to be round. However, in other embodiments, aperture 74 can have other shapes, for example an elliptical shape oriented as desired, to limit the relative motion of the muffler assembly 12 relative to the frame in a predetermined direction, or directions, more than in other directions, as desired.

Figure 7:
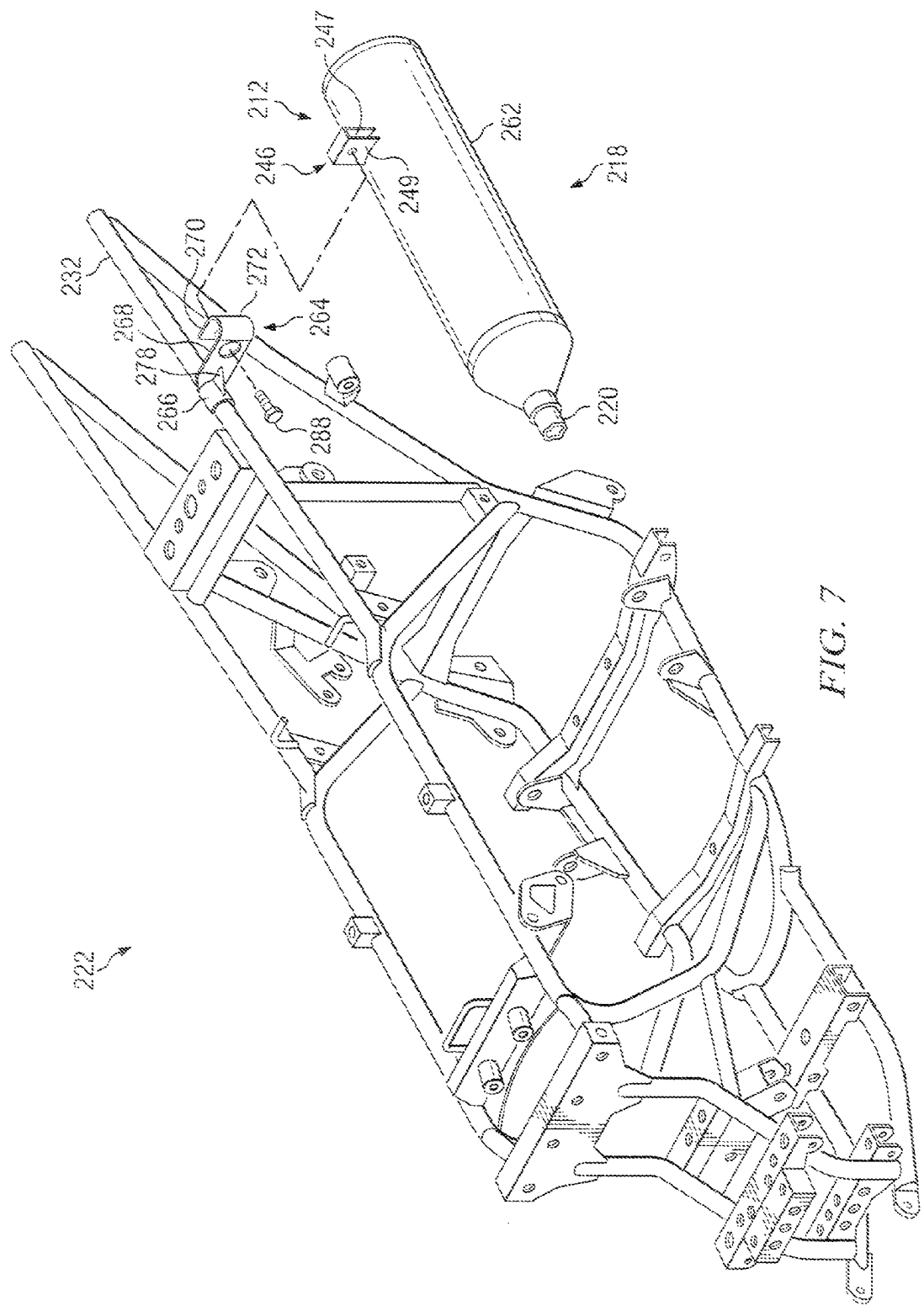
FIG. 7 is a partially exploded perspective view similar to FIG. 2, but depicting a muffler assembly according to another embodiment, and a frame according to another embodiment, of the vehicle of FIG. 1.

FIG. 7 illustrates a muffler assembly 212 according to another embodiment. The muffler assembly 212 can be a component of an exhaust system 218, which can also include an exhaust pipe 220. The exhaust pipe 220 can be attached at a rear end to the muffler assembly 212 and can be attached at a forward end to an exhaust manifold (not shown) that can communicate with an engine, such as the engine of vehicle 10. FIG. 7 also illustrates a frame 222, according to another embodiment. The vehicle 10 can include the frame 222 and the exhaust system 218, in lieu of the frame 22 and exhaust system 18, respectively. The frame 222 can include a mount structure 264, which can be similar to the mount structure 64 of the muffler assembly 12. The mount structure 264 can be attached to a member of frame 222, e.g., frame member 232, and can extend laterally outwardly, transverse to a longitudinal centerline (not shown) of the vehicle 10. The mount structure 264 can include a base portion 266 attached to the frame member 232, a laterally extending portion 268 integral with, and extending laterally outwardly away from, the base portion 266, a distal end portion 270, and a connecting portion 272, which can be integral with each of the laterally extending portion 268 and the distal end portion 270 and which can extend arcuately between the laterally extending portion 268 and the distal end portion 270. The mount structure 264 can also include a gusset 278, which can be integral with each of the base portion 266 and the laterally extending portion 268.

The muffler assembly 212 can include a muffler 262 and a mount bracket 246 attached to the muffler 262. The mount structure 264 of the frame 222 can be attached to the mount bracket 246 of the muffler assembly 212. The mount bracket 246 can be generally U-shaped, and can define an interior space 247. The mount bracket 246 can include a forward wall 249, which can define an aperture configured to receive a male fastener, e.g., male fastener 288. The muffler assembly 212 can include a female fastener (not shown), which can be a threaded weld nut. The female fastener can be positioned within the interior space 247, aligned with the aperture defined by the forward wall 249 of the mount bracket 246, and attached, e.g., welded, to a rear surface of the forward wall 249. Bracket 246 can be devoid of elastomeric material.

The distal end portion 270 of the mount structure 264 of frame 222 can be positioned in contacting engagement with a forward surface of the forward wall 249 of mount bracket 246. A threaded shank of the male fastener 288 can extend through an aperture defined by the distal end portion 270 of the mount structure 264, through the aperture defined by the forward wall 249 of the mount bracket 246 and into the female fastener attached to the forward wall 249, to attach the mount structure 264 to the mount bracket 246. An aperture defined by the laterally extending portion 268 of the mount structure 264 can be sized such that it is sufficiently large to permit a tool to pass therethrough to engage a head of the male fastener 288. The mount structure 264 can be configured to accommodate thermal expansion of the exhaust system 218 relative to the frame 222, and to attenuate the transmission of vibrations from the exhaust system 218, which may be a result of operation of the engine of vehicle 10, to the frame 222. As shown in FIG. 7, the mount structure 264 can be oriented horizontally, or substantially horizontally. However, in other embodiments, the mount structure 264 can have different angular orientations. Also, in other embodiments, the mount structure 264 can include a vertically extending portion (not shown), which can extend downwardly from the distal end portion 270, and can be attached to the mount bracket 246.

Figure 8:
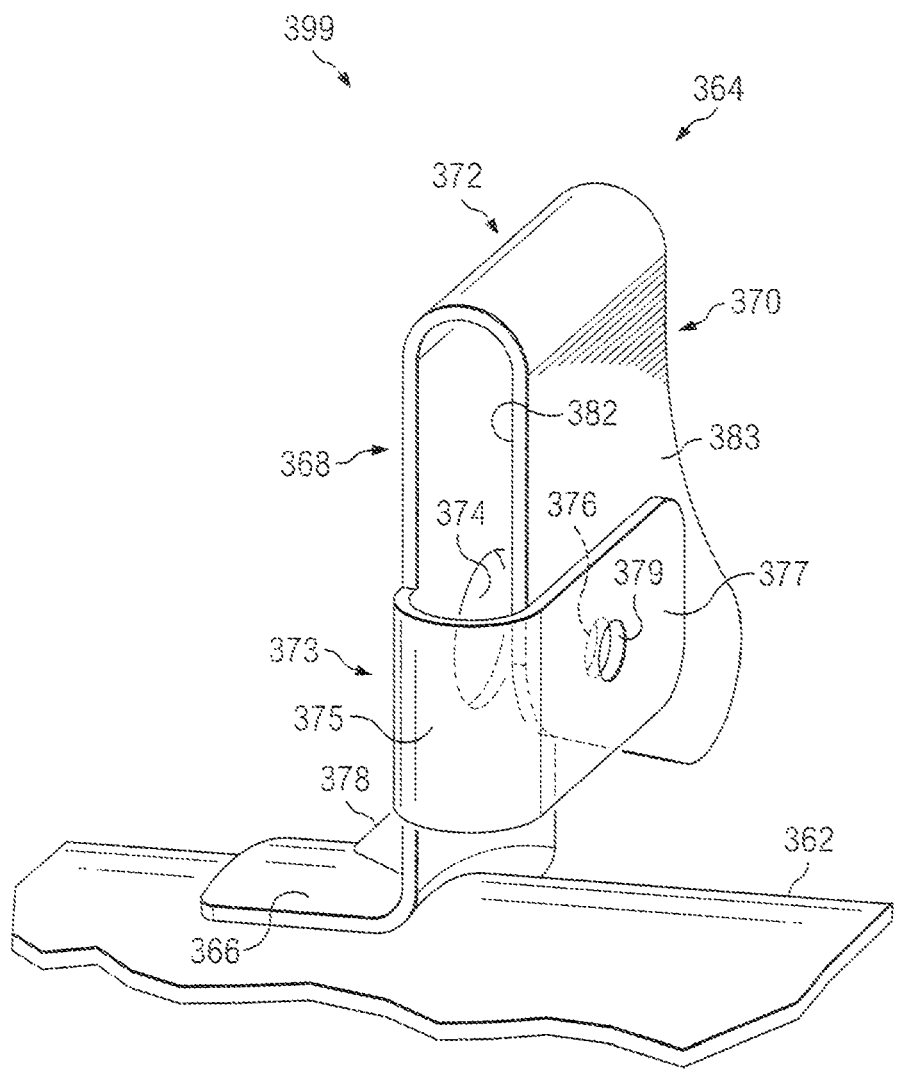
FIG. 8 is a left rear perspective view similar to FIG. 4, but depicting a portion of a muffler assembly according to another embodiment.

FIG. 8 illustrates a mount structure 399 according to another embodiment. The mount structure 399 can include a first mount structure 364 and a second mount structure 373, which can be generally J-shaped. The first mount structure 364 can include a base portion 366 that can be attached to a muffler 362 of an exhaust system. For example, the base portion 366 can be welded to muffler 362. The first mount structure 364 can also include an upright portion 368, which can be integral with the base portion 366 and can extend upwardly away from the base portion 366. The first mount structure 364 can also include a distal end portion 370, and a connecting portion 372, which can be integral with each of the upright portion 368 and the distal end portion 370, and can extend between the upright portion 368 and the distal end portion 370. The distal end portion 370 can be longitudinally spaced from the upright portion 268 and can extend downwardly from the connecting portion 372 toward the muffler 362. The distal end portion 370 can be spaced from the muffler 362. The first mount structure 364 can also include a gusset 378, which can be integral with each of the base portion 366 and the upright portion 368.

The second mount structure 373 can include a connecting portion 375 and a distal end portion 377, which can be planar. The connecting portion 375 can be integral with each of the upright portion 368 of the first mount structure 364 and the distal end portion 377 of the second mount structure 373. The distal end portion 377 of the second mount structure 373 can be positioned in contacting engagement with a rear surface 383 of the distal end portion 370 of the first mount structure 364, and can define an aperture 379. The distal end portion 370 of the first mount structure 364 can define an aperture 376, which can be coaxial with the aperture 379. The mount structure 399 can be attached to a bracket (not shown) of a frame, using any suitable fasteners, e.g., a male fastener extending through apertures 376 and 379 and into a threaded female fastener attached to the bracket of the frame. The upright portion 368 of the first mount structure 364 can define an aperture 374, which can be coaxial with each of the apertures 376 and 379 and can provide access to a head of the male fastener. In other embodiments, a female fastener can be attached to a front surface 382 of the distal end position 370 of the first mount structure 364, and a male fastener can extend through an aperture defined by the bracket of the frame, through the apertures 379 and 376, and into the female fastener. The male fastener can extend through the aperture 374. A diameter of aperture 374 and a diameter of a threaded shank of the male fastener can be sized to permit, but limit, movement of the male fastener within the aperture 374, in a vertical, or a generally vertical, direction, which can permit, but limit, movement of the muffler 362 relative to the associated frame, in a vertical, or a generally vertical, direction, which can enhance the service life of the mount structure 399.

In other embodiments mount structures that can be configured to accommodate thermal expansion of a vehicle exhaust system relative to a vehicle frame, can be attached to exhaust system components other than a muffler. For example, in one embodiment, a mount structure 464 (shown in dashed lines in FIG. 2) can be attached to the exhaust pipe 20 of the exhaust system 18 of vehicle 10. In such an embodiment, the mount structure 464 can be used in lieu of bracket 64. As shown in FIG. 2, the configuration of the mount structure 464 can be similar to the configuration of mount structure 64. It will be appreciated that a mount structure, such as mount structure 464, can be located at various locations along the exhaust pipe 20, e.g., at a joint between the exhaust pipe 20 and a head pipe (not shown) of the exhaust system 18.

Figure 9:
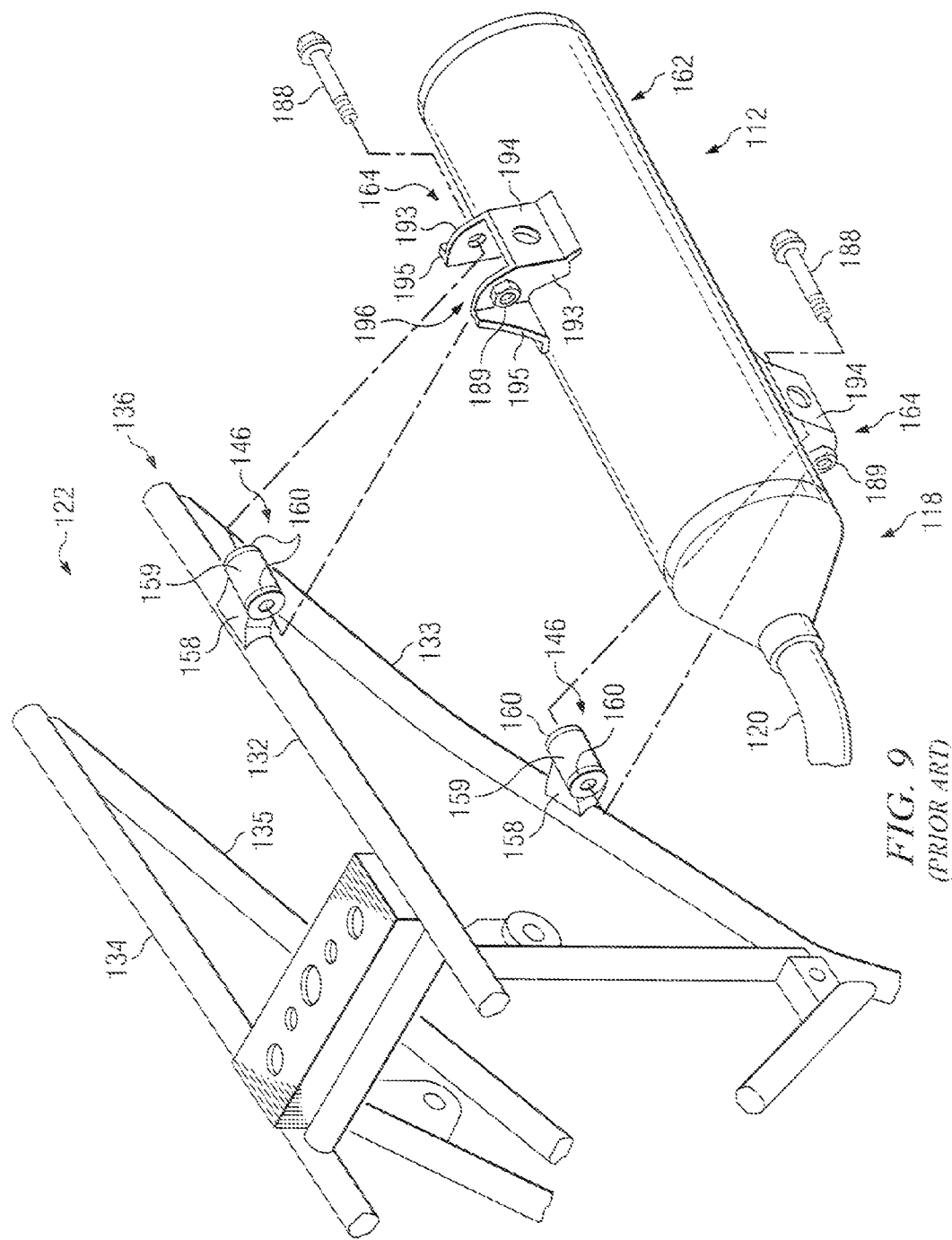
FIG. 9 is a perspective view, partially exploded, depicting a portion of a frame of a conventional vehicle and an associated Prior Art muffler assembly.

FIG. 9 illustrates a portion of a prior art frame 122 of a vehicle (not shown) and a portion of a prior art exhaust system 118, which includes a prior art muffler assembly 112 and a rear end portion of a prior art tailpipe 120 attached to a muffler 162 of the muffler assembly 112. The muffler assembly 112 also includes a pair of mount structures 164. One of the mount structures 164 is attached to an upper portion of the muffler 162 and one of the mount structures 164 is attached to a lower portion of the muffler 162, as shown in FIG. 9.

Each of the mount structures 164 includes a pair of opposing side walls 193, an end wall 194 that is integral with, and connects, the side walls 193, and a pair of flanges 195. Each of the flanges 195 is integral with a respective one of the side walls 193. Each of the side walls 193 defines an aperture that is configured to receive a bolt 188. A nut 189 is attached to one of the side walls 193 as shown in FIG. 9 and is aligned with the aperture (not shown) defined by the side wall 193 to which it is attached. Each of the side walls 193, the end wall 194, and each of the flanges 195 are attached to the muffler 162 by welding. The combined configuration of the side walls 193 and the end wall 194 is generally U-shaped, and side walls 193 and end wall 194 cooperate to define an interior space 196.

The frame 122 includes a rear portion 136, upper tubular members 132 and 134, an upwardly and rearwardly extending tubular member 133 attached at a rear end to the upper tubular member 132, and an upwardly and rearwardly extending tubular member 135 attached at a rear end to the upper tubular member 134. The frame 122 also includes a pair of mount brackets 146, with one of the mount brackets 146 attached to the upper tubular member 132. The other one of the mount brackets 146 is attached to the upwardly and rearwardly extending tubular member 133.

Each of the mount brackets 146 includes a base 158 that is attached to a respective one of the upper tubular member 132 and the upwardly and rearwardly extending tubular member 133. Each of the mount brackets 146 also includes a metal, cylindrical sleeve 159 that defines a hollow interior (not shown). Each bracket 146 also includes a pair of rubber grommets, with each of the rubber grommets including a cylindrical portion (not shown) positioned within the hollow interior of the metal, cylindrical sleeve 159 of the respective bracket 146. Each of the rubber grommets also includes a flange 160 that is integral with the respective cylindrical portion and is positioned exterior of the hollow interior defined by the metal, cylindrical sleeve 159, and in contacting engagement with the metal, cylindrical sleeve 159.

The flanges 160 of the rubber grommets of the mount brackets 146 of frame 122 absorb the thermal expansion of the muffler 112 relative to the frame 122. The flanges 160 also attenuate the transmission of vibrations of the exhaust system 118 to the frame 122. However, the rubber grommets, including flanges 160, must be resistant to relatively high temperatures of the muffler 162 and the associated mount structures 164 and, as a result, the rubber grommets are relatively expensive to manufacture. Additionally, the rubber grommets are prone to becoming brittle and deteriorating.

The use of the mount bracket 46 of frame 22, in association with the mount structure 64 of the muffler assembly 12, can avoid the costs and other disadvantages associated with the rubber grommets of the prior art brackets 146 of prior art frame 122, e.g., both the initial costs and replacement costs due to deterioration, since the brackets 46 are devoid of elastomeric material. The mount structure 64 can be configured to provide the desired support of muffler 62, accommodate thermal expansion of the muffler 62 relative to the frame 22, and attenuate the transmission of vibrations from the exhaust system 18, which may be a result of operation of the engine of the vehicle 10, to the frame 22. For example, the length $l_1$ of the upright portion 68, the length $l_2$ of the distal end portion 70, the radius of curvature R of the inner arcuate surface 84 of the connecting portion 72, as well as thickness t and distances $d_1$ and $d_2$, of the mount structure 64, can be selected to achieve a desired configuration of the mount structure 64.

Similar advantages can also be realized with frames and exhaust systems having other configurations, e.g., mount structure 264 of frame 222 and bracket 246 of muffler assembly 212. Mount structures having other configurations, e.g., mount structures 399 and 464, can also be used advantageously, for example in association with respective mating members of vehicle frames. In other embodiments, mount structures such as mount structures 64, 264, 399 and 464 can be used to accommodate relative motion between an engine of a vehicle and a frame of the vehicle, as torque output and external loading vary.

While various embodiments of a muffler assembly, and a vehicle that includes a muffler assembly, have been illustrated by the foregoing description and have been described in considerable detail, it is not intended to restrict or in any way limit the scope of the appended claims to such detail. Additional modifications will be readily apparent to those skilled in the art.

What is claimed is:

1. A vehicle comprising:
   a frame, the frame comprising a frame member and a mount bracket attached to the frame member, the mount bracket being devoid of elastomeric material; and
   an exhaust system comprising a muffler, an exhaust pipe attached to the muffler, and a mount structure attached to one of the muffler and the exhaust pipe; wherein:
      the mount structure comprises a base portion attached to the one of the muffler and the exhaust pipe, an upright portion extending upwardly away from the base portion, a distal end portion, and a connecting portion extending between the upright portion and the distal end portion;
      the distal end portion is longitudinally spaced from the upright portion and extends downwardly from the connecting portion toward the one of the muffler and the exhaust pipe, the distal end portion being spaced from the one of the muffler and the exhaust pipe;
      the distal end portion of the mount structure is attached to the mount bracket;
      the upright portion of the mount structure defines a first aperture and the distal end portion defines a second aperture, wherein the first aperture and the second aperture are coaxially disposed; and
      the mount bracket defines a third aperture, the third aperture being coaxial with each of the first aperture and the second aperture.

2. The vehicle of claim 1, wherein:
   the upright portion of the mount structure comprises a rear surface that is planar;
   the distal end portion of the mount structure comprises a front surface that is planar and is spaced from the rear surface of the upright portion by a first distance;
   the connecting portion comprises an arcuate inner surface having a radius of curvature; and
   the magnitude of the radius of curvature is one half of the magnitude of the first distance.

3. The vehicle of claim 2, wherein:
   the upright portion of the mount structure comprises a first length and the distal end portion of the mount structure comprises a second length;
   the first length is greater than the second length; and
   each of the first length and the second length is greater than the first distance.

4. The vehicle of claim 3, wherein:
   at least the base portion, the upright portion, the distal end portion and the connecting portion of the mount structure are integrally formed as a unitary structure.

5. The vehicle of claim 4, wherein:
   the upright portion of the mount structure is at least substantially parallel with the distal end portion of the mount structure.

6. The vehicle of claim 1, further comprising a male fastener comprising a head and a shank, wherein:
   the mount structure is attached to the mount bracket with the male fastener;
   the first aperture is dimensioned larger than the head of the male fastener; and
   the second aperture is dimensioned smaller than the head of the male fastener and larger than the shank of the male fastener.

7. The vehicle of claim 1, wherein:
   the upright portion of the mount structure comprises a rear surface that is planar and the distal end portion of the mount structure comprises a front surface that is planar and is longitudinally spaced from the rear surface of the upright portion by a first distance; and
   the connecting portion of the mount structure comprises an arcuate inner surface that extends between the rear surface of the upright portion and the front surface of the distal end portion, the arcuate inner surface blending smoothly with each of the rear surface of the upright portion and the front surface of the distal end portion.

8. The vehicle of claim 7, wherein:
   the upright portion of the mount structure further comprises a front surface that is planar and the distal end portion of the mount structure further comprises a rear surface that is planar; and
   the connecting portion of the mount structure further comprises an arcuate outer surface that extends between the front surface of the upright portion and the rear surface of the distal end portion, the arcuate outer surface of the connecting portion blending smoothly with each of the front surface of the upright portion and the rear surface of the distal end portion.

9. The vehicle of claim 8, wherein:
the mount bracket comprises a flange portion;
the muffler assembly further comprises a male fastener and the frame further comprises a female fastener;
the male fastener is threaded into the female fastener such that the distal end portion of the mount structure and the flange portion of the mount bracket are clamped between the male fastener and the female fastener;
the male fastener comprises a longitudinal centerline axis that is spaced from the connecting portion of the mount structure by a second distance; and
the second distance is greater than the first distance.

10. The vehicle of claim 9, wherein:
the upright portion of the mount structure comprises a first length;
the distal end portion of the mount structure comprises a second length;
the first length is greater than the second length; and
each of the first length and the second length is greater than each of the first distance and the second distance.

11. The vehicle of claim 10, wherein:
at least the base portion, the upright portion, the connecting portion and the distal end portion of the mount structure are integrally formed as a unitary structure.

12. The vehicle of claim 11, wherein:
the upright portion of the mount structure is at least substantially parallel to the distal end portion of the mount structure.

13. The vehicle of claim 11, wherein:
the frame comprises a front end and a rear end;
the muffler comprises a front end and a rear end;
the mount bracket of the frame is closer to the rear end of the frame than the front end of the frame; and
the mount structure of the muffler assembly is closer to the front end of the muffler than the rear end of the muffler.

14. A vehicle comprising:
a frame comprising a frame member;
at least one front wheel rotatably coupled with the frame;
at least one rear wheel rotatably coupled with the frame;
an exhaust system comprising a muffler assembly, the muffler assembly comprising a muffler;
a mount bracket, the mount bracket being devoid of elastomeric material, the mount bracket being attached to the frame member;
a male fastener;
a female fastener; and
a mount structure, the mount structure comprising:
 a base portion attached to the muffler;
 an upright portion integral with the base portion and extending upwardly away from the base portion;
 a distal end portion longitudinally spaced from the upright portion and being spaced from the muffler; and
 a connecting portion integral with each of the upright portion and the distal end portion and extending therebetween; wherein
the distal end portion extends downwardly from the connecting portion toward the muffler;
the upright portion of the mount structure defines a first aperture and the distal end portion of the mount structure defines a second aperture;
the mount bracket defines a third aperture, the third aperture being coaxial with each of the first aperture and the second aperture;
the male fastener extends through each of the second aperture and the third aperture and is threadedly engaged with the female fastener to attach the distal end portion of the mount structure to the mount bracket; and
the mount structure is configured to accommodate thermal expansion of the exhaust system relative to the frame.

15. The vehicle of claim 14, wherein:
the male fastener comprises a longitudinal centerline axis and extends through the first aperture defined by the upright portion of the mount structure; and
the first aperture and the male fastener are sized to permit movement of the male fastener within the first aperture in at least one direction transverse to the longitudinal centerline axis of the male fastener and to limit movement of the muffler assembly relative to the frame in the at least one direction.

* * * * *